July 7, 1970 KENZO OGAWA ET AL 3,519,759

AUTOMATIC DIALING APPARATUS

Filed Sept. 30, 1968 4 Sheets-Sheet 1

July 7, 1970 KENZO OGAWA ET AL 3,519,759

AUTOMATIC DIALING APPARATUS

Filed Sept. 30, 1968 4 Sheets-Sheet 3

United States Patent Office 3,519,759

Patented July 7, 1970

3,519,759

AUTOMATIC DIALING APPARATUS

Kenzo Ogawa, Toru Mukae, and Yoshihiko Yamasaki, Tokyo, Japan, assignors to Tokyo Shibaura Electric Co., Ltd., Kawasaki-shi, Japan, a corporation of Japan Filed Sept. 30, 1968, Ser. No. 763,664
Int. Cl. H04m 1/26
U.S. Cl. 179—90 1 Claim

ABSTRACT OF THE DISCLOSURE

According to the automatic dialing apparatus, there is inserted into a telephone number setter a card provided at one end with a plurality of comb-like teeth storing the district and unit number of the telephone of a called party. The telephone number setter causes a brush to be rotated in accordance with the comb-like formation of the card end to select a prescribed contact on an impulse generator. The impulse generator comprises a first group of dial contacts prepared by arranging on an insulating substrate plurality of electrically connected contact conductors at a substantially equal space in a circular form, an annular conductor concentrically disposed with the first group of dial contacts, a second group of dial contacts concentrically positioned with the annular conductor and arranged in a circular form in such a manner that each of the conductors is placed opposite to the middle point between the adjacent conductors of the first group, a rotor rotatably fitted to the center of an assembly of the first and second groups of dial contacts arranged in a circular form and the annular conductor, electrically connected first, second and third contact strips attached to the rotor and contacting the first and second groups of dial contacts and annular conductor and a plurality of diodes connected between the adjacent conductors of the second group of dial contacts. The digits representing the respective places of the telephone number including the district number or numbers the term "telephone number" as used herein should be construed to comprise both district and unit numbers) are selected synchronizingly with the rotor rotation thereby to supply the telephone line with the required impulses.

BACKGROUND OF THE INVENTION

In the automatic telephone exchange office, it will be extremely troublesome to dial the telephone of the specified called party each time need arises, to whom it is required to make frequent calls. To eliminate such time consuming operation, there has been developed an automatic dialing system wherein the numbers of specified subscribers' telephones are set in advance and, where required, these numbers are automatically transmitted through the line. The automatic dialing system is broadly divided into a push button type and a card type. The push button type required a print panel or the like storing called parties' telephone numbers to be incorporated in the apparatus itself, thus limiting these telephone numbers and presenting difficulties in exchange. Further, if it was desired to increase the number of called parties, there resulted the inconvenience of unavoidably enlarging the apparatus. On the other hand, the card type had the drawback that the setup of a card itself and the construction of an apparatus using it were complicated.

The impulse generator of the conventional automatic dialing system generally comprises ten dial contacts and a brush slidably rotating in contact therewith. While one rotation of a brush generates ten pulses, one of the terminals producing them is used as a basic terminal. Of the remaining nine pulses from the first to the ninth, unnecessary ones are rendered inactive by shorting the corresponding contacts so as to obtain only the required ones. However, the prior dialing apparatus of such type has the drawbacks, for example, that it is of complicated construction and bulky and moreover, often accompanied with failures.

SUMMARY OF THE INVENTION

The present invention relates to an automatic dialing apparatus wherein a card storing the telephone number of a specified called party is inserted into a number setter so as to transmit impulses automatically indicating said telephone number. The impulse generator comprises a first group of dial contacts arranged in a circular form and capable of interrupting the telephone line ten times per rotor rotation, an annular conductor concentrically disposed with the first group of contacts, a second group of dial contacts, and a plurality of diodes, each of which is positioned opposite to the middle point between the adjacent dial contacts of the second group and a setter of the number of impulses for selecting any desired number of diodes to be operated. This simple construction enables the entire apparatus to be miniaturized and also operated with remarkable accuracy and reliability. Further, the telephone number of a called party is stored in a single card, which is replaceable for each party. Accordingly the present dialing apparatus has the advantage that the number of called parties can be increased as much as desired.

DESCRIPTION OF THE PREFERRED EMBODIMENTS

Figure 1:
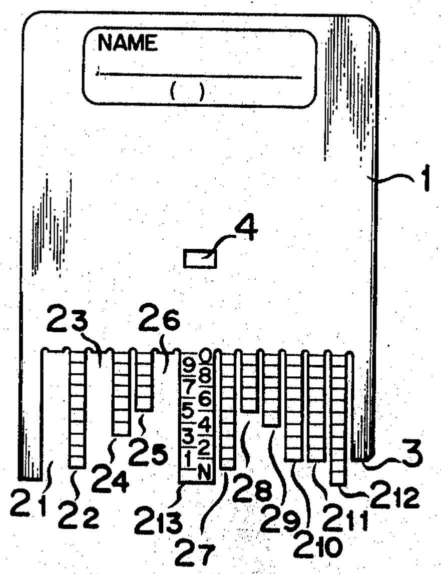
FIG. 1 is a schematic front elevation of a card prepared according to an embodiment of the present invention for setting the telephone number of a called party.

FIG. 1 is a schematic front elevation of a card 1 used in the apparatus of the present invention to set the telephone number of a called party.

The card is made of, for example, plastics and provided with notches to form a plurality of comb-like teeth $2_1$ to $2_{12}$. Just in the center of the comb-like formation is positioned a number setting graduation bearing characters 0, 9, 8 . . . 2, 1, N. The comb-like teeth as counted from the left side respectively correspond to the digits denoting the individual places of the telephone number. Selecting of the comb-like teeth designated as $2_1$ to $2_{12}$ can freely set the telephone number of a called party because the ends of these teeth are cut off at the positions corresponding to the related characters such as 0, 9, 8 . . . 2, 1, N on the number setting graduation. For instance, the card of FIG. 1 indicates the setting of a telephone number 0–N–03–501–5411. In this case the graduation character N means one required in dialing the telephone number to an external line through a private branch exchange. The character N is intended to provide a temporary pause after transmitting "0"

pulse. Accordingly, where a call is directly made to the required party without using the private branch exchange, it is unnecessary to use the character N and provide a comb-like tooth corresponding thereto and only required to set the telephone number of a called party alone. At one of the crosswise edges on that side of the card 1 which is provided with comb-like teeth is formed a notch 3. This is intended to prevent, as later described, the card 1 from being inserted into a number setter backside out. Also approximately in the center of the card 1 is performed an aperture through which to clamp the card 1 to the number setter.

Figure 4:
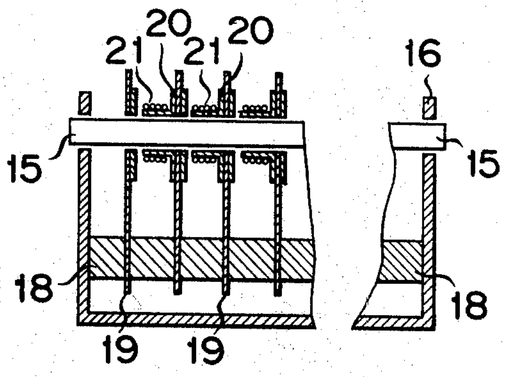
FIG. 4 is a cross section of the setter on line A—A of FIG. 2 as viewed in the direction of the arrow.
Figure 2:
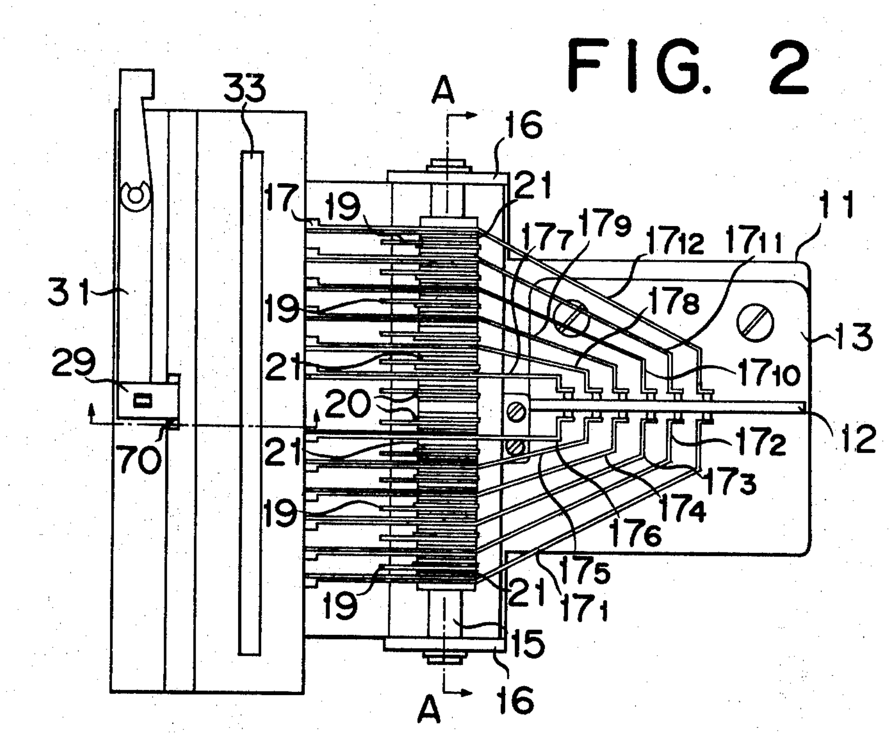
FIGS. 2 and 3 are respectively front and side views of a number setter according to an embodiment of the invention.
Figure 3:
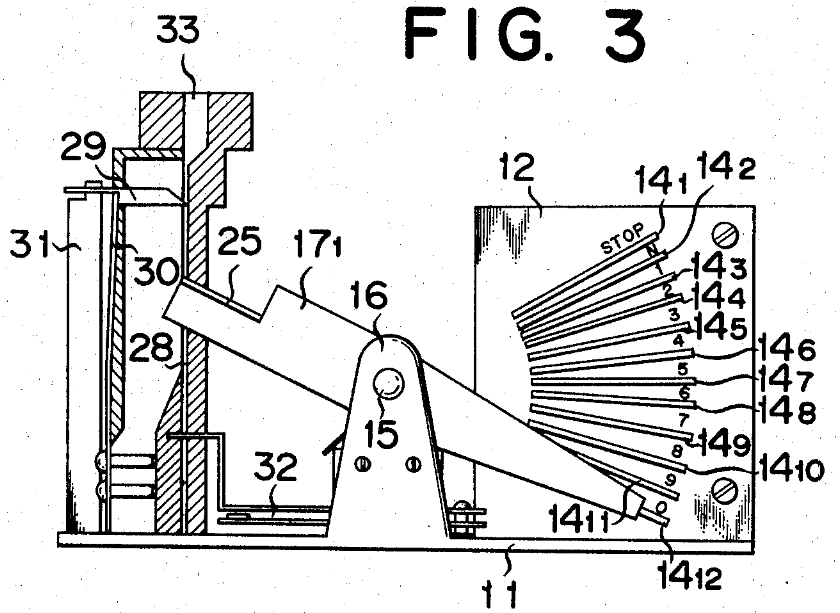

There will now be described a number setter by reference to FIGS. 2 and 3. On a substrate 11 is set upright a print panel 12, which is fixed in place by a metal support. On one side of the print panel are radially embedded, for example, twelve band conductors $\mathbf{14}_1$ to $\mathbf{14}_{12}$ as shown in the figures. On the other side of the print panel 12 are also provided the same kind of band conductors (not shown). The respective groups of the corresponding band conductors on both sides of the print panel 12 are electrically connected. Above the substrate 11 is positioned a shaft 15 made of insulating material at a slight space from and substantially perpendicular to the plane of the print panel 12. Both ends of the shaft 15 are carried on bearing members 16 arranged in an opposite relation on the substrate 11. To the shaft 15 are rotatably fitted at a substantially equal space twelve brushes $\mathbf{17}_1$ to $\mathbf{17}_{12}$ made of elastic metal. The parts of the twelve brushes extending outwardly from the shaft 15 are of different lengths and all the ends of said parts are suitably bent for contact with the twelve band conductors on the print panel 12. In this case the twelve brushes are divided into two groups substantially at the center of the shaft 15 in the longitudinal direction, and the ends of the brushes are inwardly bent in a bilaterally symmetrical relation. One group of brushes contact the band conductors on one side of the print panel 12 and the other group contact those on the other side. FIG. 4 is a cross section on line A–A′ of FIG. 2 showing the engagement of the brushes with the shaft 15. Right below the shaft 15 is dsposed a support member 18. In this support member 18 are embedded metal spacers 19 at a substantially equal interval. The spacers 19 are perforated with an aperture through which the shaft 15 is made to pass. Between the adjacent spacers 19 are inserted brushes $\mathbf{17}_1$ to $\mathbf{17}_{12}$ opposite to that on which they contact the of insulating materal for engagement with the shaft 15. These washers 20 are wound with a coiled spring 21. The coiled springs 21 press the brushes to the spacers 19 for electrical connection and supply the brushes $\mathbf{17}_1$ to $\mathbf{17}_{12}$ with a rightward rotating force around the shaft 15. The brushes are given a certain rotating force so as to cause the ends thereof contacting the surface of the print panel 12 to be always brought back to the specfied positions at the bottom part of the upright print panel 12, namely, below the lowest band conductor embedded therein. At a part of the side of the brushes The top of the box 26 is perforated with a slot 28 through which the card 1 is inserted. Below the slot 28 is provided a void space extending downward to the bottom of the box 26. The direction in which said space etxends intersects that in which the flapped section 25 of the brush is introduced into the guide groove 27, thus causing the inserted card to press the brush downward due to the load applied thereby on the flapped section 25. At the bottom end of the void space below the card-inserting slot 28 is formed a protuberance to fit in with the aforesaid notch 3 cut at one of the crosswise edges of the card 1.

As shown in FIG. 2, the box 26 is perforated with a through hole 70 which runs through the backside of the box 26 up to the card-inserting space extending downward from the slot 28. In the through hole 70 is held a panel 29 for resting the inserted card 1 so as to be operated by a lever 31. The panel 29 is always pressed from the backside thereof by an elastic strip 30 fixed on the substrate 11. In the bottom center of the void space below the card-inserting slot 28 of the box 26 is positioned a power source switch 32. When the card is inserted into the box the contact strip of the switch is pushed down to close the contact.

When the card 1 is inserted downward into the box of the number setter arranged as described above through a card inlet 33, the panel 29 registers with the aperture 4 perforated in the card 1 to cause it to be securely clamped. If the card is put in backside out by mistake, the corner of the crosswise edge of the card 1 which is not provided with a notch 3 strikes the protuberance formed at the bottom of the card-inserting space below the slot 28, obstructing the card in being introduced to a sufficient depth to be securely clamped. Namely, the top side of the card 1 is inclined, so that the wrong insertion of the card can be easily recognized. When the card 1 is properly clamped, the brushes $\mathbf{17}_1$ to $\mathbf{17}_{12}$ are rotated in accordance with the different lengths of the comb-like teeth $\mathbf{2}_1$ to $\mathbf{2}_{12}$ formed at the bottom of the card 1. Thus the ends of the brushes $\mathbf{1}_1$ to $\mathbf{17}_{12}$ slide over the surface of the print panel 12 only through the prescribed angles to contact the specified ones of the band conductors $\mathbf{14}_1$ to $\mathbf{14}_{12}$. Of these twelve band conductors, the topmost one $\mathbf{14}_1$ is used to stop the later described dialing operation and the second one $\mathbf{14}_2$ is used to issue an impulse designated as N for connection to an external line. The remaining conductors $\mathbf{14}_3$ to $\mathbf{14}_{12}$ are so operated as to correspond to the comb-like teeth $\mathbf{17}_1$ to $\mathbf{17}_{12}$ representing the digits 1, 2 . . . 9, 0. Thus the digits denoting the individual places of the telephone number stored in the card 1 are indicated by the positions of the band conductors $\mathbf{14}_1$ to $\mathbf{14}_{12}$ on the print panel 12 as specified by the brushes $\mathbf{17}_1$ to $\mathbf{17}_{12}$ corresponding to said place digits. For instance, when a card storing the telephone number 0–N–03–501–5411 shown in FIG. 1 is inserted those of the brushes $\mathbf{17}_1$ to $\mathbf{17}_{12}$ corresponding to these characters contact the related band conductors as illustrated in the table below.

| | | | | | | | | | | | | |
|---|---|---|---|---|---|---|---|---|---|---|---|---|
| Brushes | $17_1$ | $17_2$ | $17_3$ | $17_4$ | $17_5$ | $17_6$ | $17_7$ | $17_8$ | $17_9$ | $17_{10}$ | $17_{11}$ | $17_{11}$ |
| Band conductors | $14_{12}$ | $14_2$ | $14_{12}$ | $14_5$ | $14_7$ | $14_{12}$ | $14_3$ | $14_7$ | $14_6$ | $14_3$ | $14_3$ | $14_2$ |
| Telephone number | 0 | N | 0 | 3 | 5 | 0 | 1 | 5 | 4 | 1 | 1 | ------- |

Figure 5:
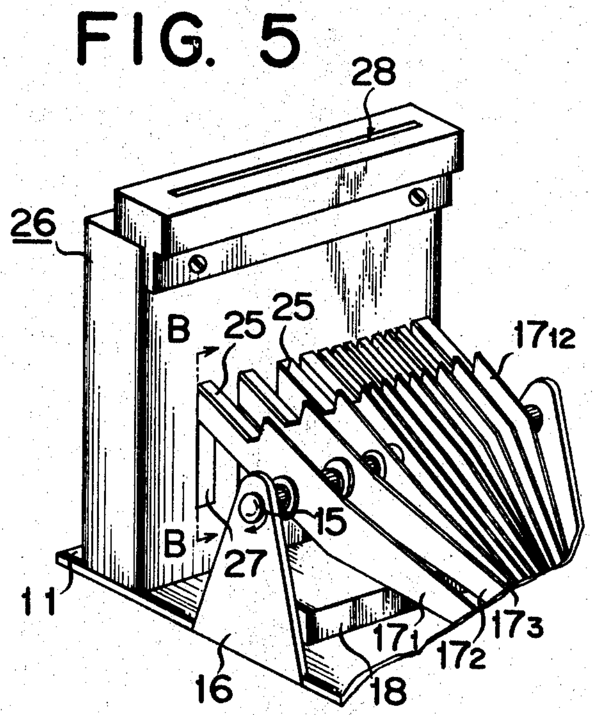
FIG. 5 is a perspective of the main part of the dialing apparatus according to an embodiment of the invention.
Figure 6:
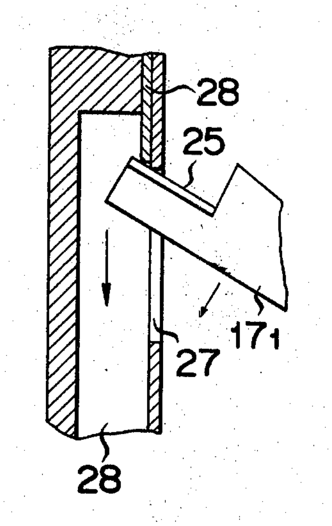
FIG. 6 is a cross section of the apparatus on line B—B of FIG. 5 as viewed in the direction of the arrow.

$\mathbf{17}_1$ to $\mathbf{17}_{12}$ opposite to that on which they contact the band conductors on the print panel 12 is cut a notch perpendicular to the longitudinal direction of the brushes so as to form a flap 25. The flap 25 is bent at right angles to the vertical plane of the brush. When inserted, the card 1 presses the flap downward. The flapped section 25 fits in with a guide groove 27 provided on the front side of the later described box 26 into which the card is inserted. As shown in FIGS. 5 and 6, the box 26 is fixed on the substrate 11 near the rearside of the brushes $7_1$ to $7_{12}$. In the box 26 is provided a rectangular guide groove 27 into which the flapped section 25 of the brush is inserted so as to rotate vertically.

In the case illustrated here, the comb-like teeth of the card 1 used in storing the telephone number are twelve in total. However, where a telephone number has less than twelve places, the unnecessary teeth are kept unnotched. The ends of the brushes, which are pressed down by the longest unnotched teeth contact the topmost band conductor $\mathbf{14}_1$ on the print panel 12. This band conductor $\mathbf{14}_1$ is connected to a separate means so as to stop the operation of the impulse generator.

Figure 7:
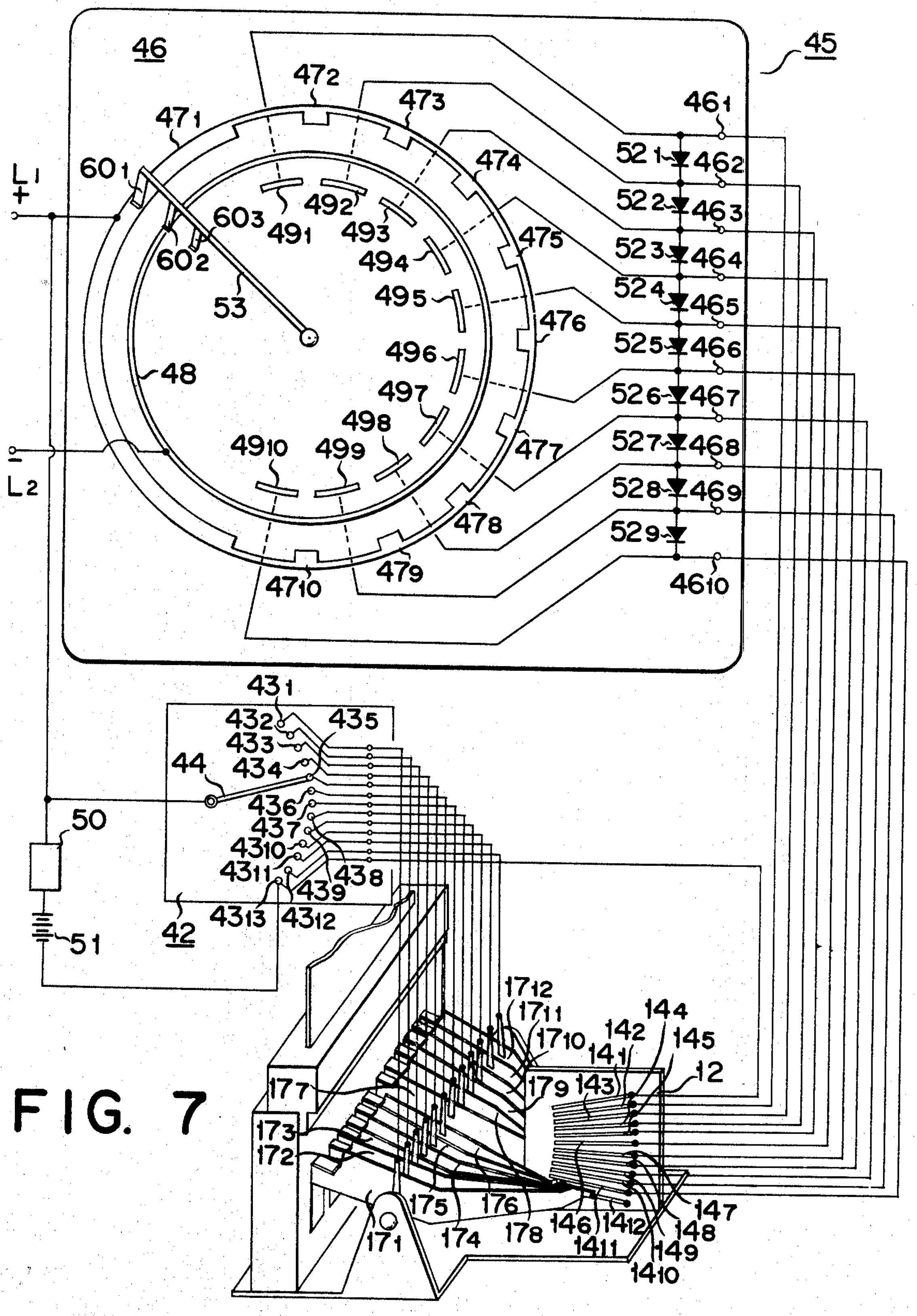
FIG. 7 is a schematic diagram of the construction of the apparatus according to the embodiment of the invention, including its circuit setup.

There will now be described an automatic dialing apparatus using a number setter of the aforesaid arrangement by reference to FIG. 7. The brushes $\mathbf{17}_1$ to $\mathbf{17}_{12}$ of the number setter 41 are connected to the fixed contacts $43_1$ to $43_{12}$ on a place shifter 42 by their respective conductors. The movable contact strip 44 of the place shifter 42 is connected to one $L_1$ of the telephone lines $L_1$ and $L_2$. On the other hand, the band conductors $14_2$ to $14_{11}$ are connected to the input terminals $46_1$ to $46_{10}$ of an impulse generator 45 by their respective lines. In this case the band conductor $14_1$ is connected to the fixed contact $43_{13}$ on the place shifter 42, and the band conductor $14_{12}$ is not connected to any other part of the dialing apparatus. The fixed contact $43_{13}$ on the place shifter 42 is connected to the movable contact strip 44 of the place shifter 42 through a relay 50 and a power source 51 for its operation connected in series. The relay 50 is actuated to stop the operation of the impulse generator, place shifter, etc.

The impulse generator 45 comprises a first group of dial contacts prepared by arranging on an insulating substrate a plurality of, for example, ten contact conductors $47_1$ to $47_{10}$ at a substantially equal space in a circular form, using print wiring. Of the first group of dial contacts, the lengths of the contact conductors $47_2$ to $47_{10}$ in the circumferential direction and the spaces therebetween are made to have a ratio of 1 to 2 so as to match the "make" and "break" times as so called.

Further, the contact conductor $47_1$ is formed longer than the other contact conductors $47_2$ to $47_{10}$ so as to allow for a minimum pause. These conductors $47_1$ to $47_{10}$ are connected to each other at the outermost circumference using print wiring. Inside of the first group of dial contacts is concentrically formed an annular conductor 48 similarly using print wiring. Further inside of the annular conductor 48 is concentrically arranged in a circular form a second group of a plurality of, for example, ten contact conductors $49_1$ to $49_{10}$, each of which is positioned opposite to the middle point between the adjacent conductors of the first group. To that part of an insulating substrate 46 corresponding to the center of an assembly of the first and second groups of dial contacts and annular conductor is rotatably fitted a rotor 53. The rotor 53 is designed to rotate once per minute by a motor (not shown). To the rotor 53 are fitted first, second and third contact strips $60_1$, and $60_2$ and $60_3$ electrically connected to each other. The first contact strip $60_1$ slides over the conductors $47_1$ to $47_{10}$ of the first group of dial contacts, the second contact strip $60_2$ over the annular conductor 48 and the third contact strip $60_3$ over the conductors $49_1$ to $49_{10}$ of the second group of dial contacts. From the conductors $49_1$ to $49_{10}$ of the second group of dial contacts are led out impulse control terminals $46_1$ to $46_{10}$ by means of their respective conductors. Between these terminals are connected diodes $52_1$ to $52_9$ having the same polarity. The impulse control terminals $46_1$ to $46_{10}$ are connected to the first contacts $43_1$ to $43_{12}$ on the place shifter 42 through the band conductors $14_1$ to $14_{12}$ on the print panel 12 and the brushes $17_1$ to $17_{12}$. Rotation of the movable contact strip 44 of the place shifter 42 causes the impulse control terminals to be selectively operated for connection to the telephone line $L_1$ in accordance with the digits representing the places of the telephone number to be called. Connection between the movable contact strip 44 and impulse control terminals $46_1$ to $46_{10}$ is carried out synchronizing with the rotation of the rotor 53. The telephone line $L_1$ is connected to the conductors $47_1$ to $47_{10}$ of the first group of dial contacts and the other telephone line $L_2$ to the annular conductor 48.

There will now be described the operation of the impulse generator constructed in the aforementioned manner, more particularly the case where the movable contact strip 44 of the place shifter 42 is connected to an impulse control terminal, for example, $46_4$, namely, the impulse representing the digit "3" is to be issued. While the first contact strip $60_1$ of the rotor 53 slides over the conductor $47_1$ of the first group of dial contacts during one cycle of its rotation, the telephone lines $L_1$ and $L_2$ are connected by a circuit consisting of the telephone line $L_1$, first contact strip $60_1$, second contact strip $60_2$, annular conductor 48, telephone line $L_2$, so that the apparatus remains in the condition of "make" as so called where there is not produced any impulse. However, when the first contact strip $60_1$ of the rotor 53 is brought half way between the conductors $47_1$ and $47_2$ of the first group of dial contacts the first contact strip $60_1$ is disconnected from the related conductors of the first group of dial contacts, so that the aforesaid circuit is opened, namely, brought to the so-called "break" condition to generate one impulse. This condition comes to an end when the first contact strip $60_1$ of the rotor 53 is brought on the contact $47_2$, again producing the "make" condition. Now let us consider the case where the first contact strip $60_1$ of the rotor 53 is brought half way between the conductors $47_4$ and $47_5$ of the first group of dial contacts after the alternate repetition of "makes" and 'breaks" and resultant generation of second and third impulses. While, in this case, the connection circuit between the telephone lines $L_1$ and $L_2$ is turned off, these lines are closed by the succeeding circuit consisting of the telephone line $L_1$, movable contact strip 44, fixed contact $43_4$, brush $17_4$, band conductor $14_4$, impulse control terminal $46_4$, conductor $49_4$ of the second group of dial contacts, telephone line $L_2$ so as to render the fourth pulse inactive. Further when the first contact strip $60_1$ of the rotor 53 comes half way between the conductors $47_5$ and $47_6$ of the first group of dial contacts, the telephone lines $L_1$ and $L_2$ are connected, if the line $L_1$ has a positive potential relative to the line $L_2$, by the circuit consisting of the telephone line $L_1$, movable contact strip 44, impulse control terminal $46_4$, diode $52_4$, conductor $49_5$ of the second group of dial contacts, third contact strip $60_3$ of the rotor 53, second contact strip $60_2$ of the rotor 53, telephone line $L_2$ so as to render also the fifth pulse inactive. Thus the remaining or unnecessary impulses are all made inactive by a similar operation. Eventually, of the ten impulses generated by one rotation of the rotor 53, only the first three impulses are effectively issued from the telephone lines $L_1$ and $L_2$. Also where the rotor 53 remains in the position to generate the first three impulses, for example, where the first contact strip $60_1$ of the rotor 53 lies half way between the conductors $47_3$ and $47_4$ of the first group of dial contacts, the circuit involving the contact strip 44 is turned off because the diode $46_4$ is connected in opposite polarity to the potential across the telephone lines $L_1$ and $L_2$, so that the resultant impulse is not rendered inactive but effectively issued from the telephone lines $L_1$ and $L_2$.

The impulse generator 45 and place shifter 42 are driven by a motor (not shown), and provided with gears and cam means so as to allow the movable contact strip 44 of the place shifter 42 to be transferred only by one contact point when the rotor 53 of the impulse generator 45 makes one rotation.

Figure 8:
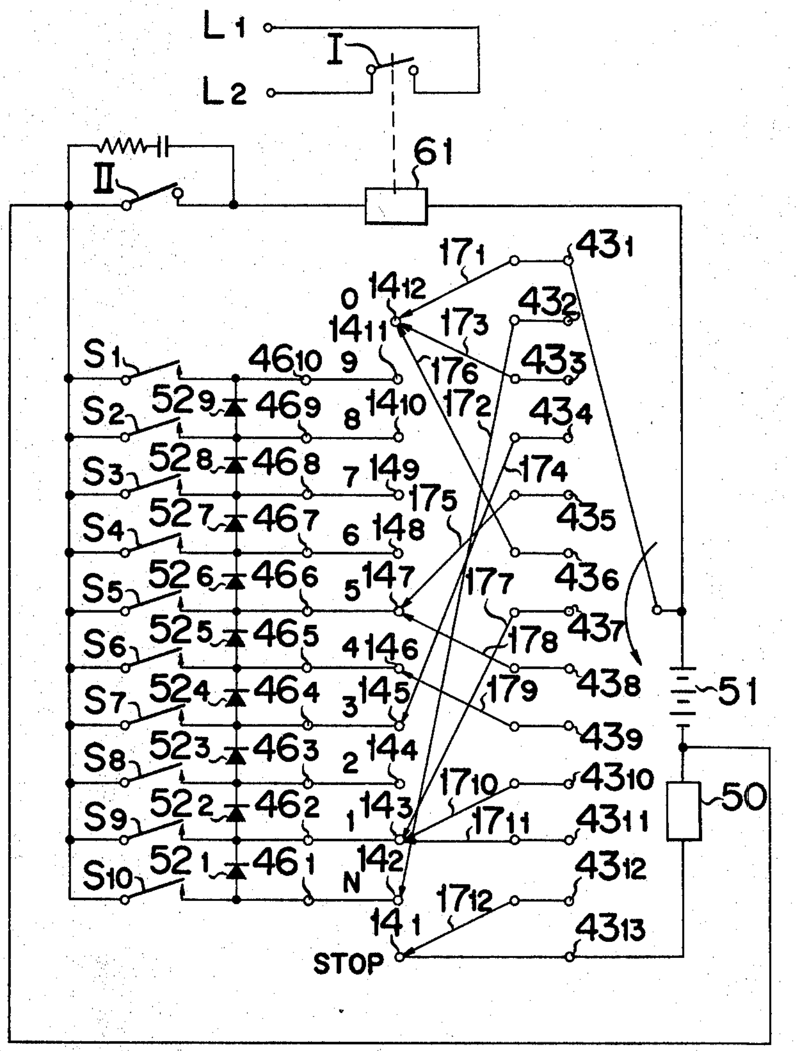
FIG. 8 is an electrical circuit of FIG. 7.

There will now be described the operation of an automatic dialing apparatus of the aforementioned arrangement by reference to FIG. 8. The figure is an equivalent circuit diagram of the apparatus shown in FIG. 7. The same parts as those of FIG. 7 are denoted by the same numerals. Numeral I of FIG. 8 represents the first group of dial contacts, showing the way in which the telephone lines $L_1$ and $L_2$ are interrupted by the first segment of the annular conductor 47 of the impulse generator 45. Numeral 61 is a relay for controlling the first group of dial contacts I. Characters $S_1$ to $S_{10}$ represent the second group $49_1$ to $49_{10}$ of dial contacts which are closed when the third contact strip $60_3$ of the rotor 53 contacts them. The second group of dial contacts $S_1$ to $S_{10}$ is closed when the first group of dial contacts I is opened. The number setter is illustrated as indicating condition where the telephone number 0–N–03–501–5411 is set by connecting the brushes $17_1$ to $17_{12}$ to the band conductors $14_1$ to $14_{12}$ in the manner shown in the aforementioned table.

When a card is inserted into a number setter 41 the brushes $17_1$ to $17_{12}$ are connected as illustrated and the source switch 32 is closed to operate a motor (not shown), causing the first group of dial contacts to be interrupted. At the initial stage the movable strip 44 of the place shifter 42 contacts the fixed contact $43_1$. The digit "1" representing the first place is set by causing the brush $17_1$ to contact the band conductor $14_{12}$. Since, in this case, the band conductor $14_{12}$ remains unoperated, the impulse generator 45 is not subject to any restriction. The first group of dial contacts is contacted by the first contact strip $60_1$ of the rotor 53 driven by a motor and issues ten intermittent pulses to the telephone lines $L_1$ and $L_2$. When the rotor 53 of the impulse generator 45 makes one rotation the movable contact strip 44 of the place shifter 42 is brought to the fixed contact $43_2$ by cam means, thereby to supply the positive potential of the telephone line $L_1$ to the input terminal $46_1$ of the impulse generator 45 through a circuit consisting of the movable contact strip 44 of the place shifter 42, fixed contact $43_2$ of the place shifter 42, brush $17_2$ of the number setter 41, band conductor $14_2$ of the print panel 12. When the first group I of dial contacts is opened under such condition the conductor $S_1$ of the second group of dial contacts is closed. In this case there is not produced any impulse because both ends of the first group I of dial contacts are shorted. When the first group I of dial contacts is opened for the second time, the conductor $S_2$ of the second group of dial contacts is closed at the same time. Accordingly, the current supplied from the telephone line $L_1$ to the input terminal $14_2$ of the impulse generator is allowed to flow to the telephone line $L_1$ through the diode $52_1$ and the conductor $S_2$ of the second group of dial contacts so that the lines are not disconnected, nor is there generated any impulse. While the first group I of dial contacts is interrupted ten times, namely, while the rotor 53 of the pulse generator 45 makes one rotation, all impulses generated by the contact of the first contact strip $60_1$ of the rotor 53 with the first group I of dial contacts are rendered inactive and are not supplied to the telephone lines $L_1$ and $L_2$ during that time. This affords a pause required in connecting the private branch exchange to an external line. At the end of this pause, the place shifter 42 conducts the movable contact strip 44 to the first fixed contact $43_3$. While this is intended to issue an impulse representing the digit "2" of the second place, the same operation as described above is used and description thereof is omitted. There will now be described the case where the movable strip 44 is brought to the fourth fixed contact $43_4$ to generate an impulse denoting the digit "4" of the third place. In this case the positive potential of the telephone line $L_1$ is supplied to the input terminal $46_4$ of the impulse generator 45 through a circuit consisting of the telephone line $L_1$, movable contact strip 44 of the place shifter 42, fixed contact $43_4$ of the place shifter 42, brush $17_4$ of the number setter 41, band conductor $14_5$ on the print panel 12. When the first group of dial contacts is opened under such condition, the conductor $S_1$ of the second group of dial contacts is closed. In this case, however, the voltage supplied to the input terminal $46_4$ of the impulse generator 45 is impressed in a direction opposite to that in which the diodes $52_1$, $52_2$ and $52_3$ are conducted, so that these diodes are not conducted. Accordingly, the telephone lines $L_1$ and $L_2$ cannot be shorted by a circuit involving the conductor $S_1$ of the second group of dial contacts, so that impulses generated by the contact of the contact strip $60_1$ of the rotor 53 with the first group of dial contacts are not rendered inactive but transmitted to the telephone lines $L_1$ and $L_2$. Also when the first group of dial contacts is opened for the second and third times, impulses are issued as effectively as before. However, when the first group of dial contacts is opened for the fourth time the conductor $S_1$ of the second group of dial contacts is closed so that the input terminal $48_4$ of the impulse generator 45 is connected to the telephone line $L_2$ through the conductor $S_4$ of the second group of dial contacts and the first group I of dial contacts is shorted. When the first group of dial contacts is opened for the fifth time the conductor $S_5$ of the second group of dial contacts is closed and the input terminal $46_4$ of the impulse generator supplies the diode $52_4$ with a bias voltage in a normal direction for its conduction, so that the first group I of dial contacts is shortened and the impulse is rendered inactive. Thereafter, all other unnecessary impulses are similarly made inactive. Eventually only three impulses corresponding to the digit "3" included in the telephone number are issued from the telephone lines $L_1$ and $L_2$. In this manner, impulses corresponding to the digits denoting the respective places of the telephone number are supplied by turns to the telephone lines. When all impulses corresponding to the digits of the telephone number places are issued the movable contact strip 44 of the place shifter 42 is connected to the brush $17_{12}$ and the relay 50 is excited by connection to the source 51 to stop the operation of the impulse generator 45 and place shifter 42 and consequently the entire dialing apparatus.

As mentioned above, a card previously storing the telephone number of a called party is inserted into a number setter and impulses denoting the respective digits of the telephone number are automatically issued to call said party. Since the telephone number of a called party can be easily stored in a single card, the dialing apparatus of the present invention is of extremely simple construction and permits the number of called parties to be increased as such as desired. Further, the number setter comprises many brushes sliding over the same print panel and has the advantage of rendering the entire dialing apparatus compact.

The impulse generator of the present invention comprises a first group of dial contacts so arranged as to interrupt the connection of the telephone lines $L_1$ and $L_2$ ten times by turns during one rotation of a rotor, a second group of dial contacts positioned between the telephone lines $L_1$ and $L_2$ in parallel with the first group of dial contacts and closing said dial contacts at the time of their break and a plurality of diodes disposed between these contact conductors thereby to supply the required impulses to the telephone lines $L_1$ and $L_2$. The present dialing apparatus is of simple arrangement, permits miniaturization and can be operated with remarkable accuracy and reliability.

What is claimed is:

1. An automatic dialing apparatus consisting of:

(a) a telephone number setter comprising a card provided at one end with a plurality of comb-like teeth having different lengths corresponding to the digits representing the respective places of the telephone number, a plurality of brushes, one end of which is pressed down by the comb-like teeth of the card when it is inserted into a card-inserting box and the other end of which is so arranged as to slide in the same plane, a print panel so positioned as to allow the sliding of said other end of each brush and having a plurality of band conductors embedded in the top surface, and a source switch which is closed when the card is inserted, (b) an impulse generator comprising a first group of dial contacts prepared by arranging on an insulating substrate a plurality of electrically connected contact conductors at a substantially equal space in a circular form, an annular conductor concentrically disposed therewith, a second group of dial contacts concentrically positioned with the annular conductor and prepared by arranging a plurality of contact conductors in a circular form in such a manner that each of the conductors is located opposite to the middle point between the adjacent conductors of the first group, a rotor rotatably fitted to the center of an assembly of the first and second groups of dial contacts arranged in a circular form and the annular conductor, electrically connected first, second and third contact strips attached to the rotor and contacting the first and second groups of dial contacts and the annular conductor respectively, a plurality of diodes connected between the contact conductors of the second group and input terminals connected to the band conductors on the print panel of the telephone number setter and also to both poles of each of the diodes, and (c) a place shifter for setting the digits representing the respective places of the telephone number comprising a movable contact strip synchronizing rotating with the rotor of the impulse generator, fixed contacts connected to the respective brushes of the telephone number setter and a source of direct currents for driving the movable contact strip and operable by a source switch provided in the telephone number setter.

No references cited.

KATHLEEN H. CLAFFY, Primary Examiner

T. D'AMICO, Assistant Examiner